United States Patent
Rodrigues et al.

(10) Patent No.: US 12,499,658 B2
(45) Date of Patent: Dec. 16, 2025

(54) TRAINING APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 461 days.

(21) Appl. No.: 18/009,218

(22) PCT Filed: Jun. 11, 2020

(86) PCT No.: PCT/JP2020/023020
§ 371 (c)(1),
(2) Date: Dec. 8, 2022

(87) PCT Pub. No.: WO2021/250850
PCT Pub. Date: Dec. 16, 2021

(65) Prior Publication Data
US 2023/0215144 A1 Jul. 6, 2023

(51) Int. Cl.
*G06V 10/774* (2022.01)
*G06T 3/02* (2024.01)
(Continued)

(52) U.S. Cl.
CPC .............. *G06V 10/774* (2022.01); *G06T 3/02* (2024.01); *G06T 5/77* (2024.01); *G06T 7/11* (2017.01);
(Continued)

(58) Field of Classification Search
CPC ............. G06T 3/02; G06T 2207/10032; G06T 2207/20081; G06V 10/7715; G06V 10/82
See application file for complete search history.

(56) References Cited

U.S. PATENT DOCUMENTS 11,328,523 B2 * 5/2022 Shechtman ............ G06V 20/20
2020/0134844 A1 4/2020 Mittal et al.

FOREIGN PATENT DOCUMENTS

WO WO-2007000999 A1 * 1/2007 ............... G06T 7/48

OTHER PUBLICATIONS

Bridging the Domain Gap for Ground-to-Aerial Image Matching (Year: 2019).*
Shi_Where_Am_I_Looking_At_Joint_Location_and_Orientation_Estimation_CVPR_2020_paper (Year: 2020).*
International Search Report for PCT Application No. PCT/JP2020/023020, mailed on Jul. 28, 2020.
Liu Liu and Hongdong Li, "Lending Orientation to Neural Networks for Cross-view Geo-localization," Computer Research Repository, Apr. 2, 2019, p. 5624-5633.
(Continued)

*Primary Examiner* — Amir Alavi
*Assistant Examiner* — Zaid Muhammad Saleh
(74) *Attorney, Agent, or Firm* — Sughrue Mion, PLLC

(57) ABSTRACT

The training apparatus (2000) performs a first phase training and a second phase training of a discriminator (10). The discriminator (10) acquires a ground-view image and an aerial-view image, and determines whether the acquired ground-view image matches the acquired aerial-view image. The first phase training is performed using a ground-view image and a first level negative example of aerial-view image. The first level negative example of aerial-view image includes scenery of a different type from scenery in the ground-view image. The second phase training is performed using the ground-view image and a second level negative example of aerial-view image. The second level negative example of aerial-view image includes scenery of a same type as scenery in the ground-view image.

12 Claims, 11 Drawing Sheets

(51) Int. Cl.
  *G06T 5/77*    (2024.01)
  *G06T 7/11*    (2017.01)
  *G06V 10/44*   (2022.01)
  *G06V 10/74*   (2022.01)
  *G06V 10/77*   (2022.01)
  *G06V 10/82*   (2022.01)
  *G06V 20/17*   (2022.01)

(52) U.S. Cl.
  CPC ............ *G06V 10/44* (2022.01); *G06V 10/761* (2022.01); *G06V 10/7715* (2022.01); *G06V 10/82* (2022.01); *G06V 20/17* (2022.01); *G06T 2207/10032* (2013.01); *G06T 2207/20081* (2013.01); *G06T 2207/20084* (2013.01); *G06T 2207/20132* (2013.01)

(56) References Cited

OTHER PUBLICATIONS

Sixing Hu et al., "CVM-Net: Cross-View Matching Network for Image-Based Ground-to-Aerial Geo-Localization", 2018 IEEE/CVF Conference on Computer Vision and Pattern Recognition, Jun. 18, 2018, p. 7258-7267.

Yicong Tian et al., "Cross-View Image Matching for Geo-localization in Urban Environments", 2017 IEEE Conference on Computer Vision and Pattern Recognition (CVPR), Mar. 22, 2017, p. 3608-3616.

* cited by examiner

GROUND-VIEW IMAGE

SCENERY: RESIDENTIAL AREA

POSITIVE EXAMPLE OF
AERIAL-VIEW IMAGE

SCENERY: RESIDENTIAL AREA

1ST LEVEL
NEGATIVE EXAMPLE OF
AERIAL-VIEW IMAGE

SCENERY: ROUNDABOUT

1ST LEVEL
NEGATIVE EXAMPLE OF
AERIAL-VIEW IMAGE

SCENERY: OVERPASS

2ND LEVEL
NEGATIVE EXAMPLE OF
AERIAL-VIEW IMAGE

SCENERY: RESIDENTIAL AREA

TRAINING APPARATUS, CONTROL METHOD, AND NON-TRANSITORY COMPUTER-READABLE STORAGE MEDIUM

This application is a National Stage Entry of PCT/JP2020/023020 filed on Jun. 11, 2020, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a set of CNNs (Convolutional Neural Networks) for extracting features from a ground-view image and an aerial-view image to be compared with each other. Specifically, one of the CNNs acquires a ground-view image and orientation information corresponding thereto, and computes joint features from the mixed signal containing the ground-view image and the orientation information. The other one acquires an aerial-view image and orientation information corresponding thereto, and computes joint features from the mixed signal containing the aerial-view image and the orientation information. Then, whether the ground-view image matches the aerial-view image is determined based on the computed joint features.

CITATION LIST

Non Patent Literature

NPL1: Liu Liu and Hongdong Li, "Lending Orientation to Neural Networks for Cross-view Geo-localization," Computer Research Repository, Apr. 2, 2019.

SUMMARY OF INVENTION

Technical Problem

NPL1 does not describe an order of aerial-view images used in the training of the Siamese Network. This means that, when training the networks, a plurality of aerial-view images may be fed into the Siamese Network in an arbitrary order.

However, in terms of a training of a discriminator that performs ground-to-aerial cross-view matching, the inventors of the present invention consider that an order of aerial-view images fed into the discriminator is important in order to achieve precise ground-to-aerial cross-view matching.

One of objectives of the present disclosure is to provide a technique to improve accuracy of a discriminator that performs matching between a ground-view image and an aerial-view image.

Solution to Problem

The present disclosure provide a training apparatus comprising: at least one processor; and memory storing instructions, wherein the at least one processor is configured to execute the instructions to: perform a first phase training of a discriminator, the discriminator acquiring a ground-view image and an aerial-view image and determining whether the acquired ground-view image matches the acquired aerial-view image; and perform a second phase training of the discriminator.

The first phase training is performed using a ground-view image, a positive example of the aerial-view image, and a first level negative example of the aerial-view image, the first level negative example of the aerial-view image including scenery of a different type from scenery in the ground-view image.

The second phase training is performed using the ground-view image, a positive example of the aerial-view image, and a second level negative example of the aerial-view image, the second level negative example of the aerial-view image including scenery of a same type as scenery in the ground-view image.

The present disclosure further provides a control method that is performed by a computer. The control method performed by a computer, comprising: performing a first phase training of a discriminator, the discriminator acquiring a ground-view image and an aerial-view image and determining whether the acquired ground-view image matches the acquired aerial-view image; and performing a second phase training of the discriminator.

The first phase training is performed using a ground-view image, a positive example of the aerial-view image, and a first level negative example of the aerial-view image, the first level negative example of the aerial-view image including scenery of a different type from scenery in the ground-view image.

The second phase training is performed using the ground-view image, a positive example of the aerial-view image, and a second level negative example of the aerial-view image, the second level negative example of the aerial-view image including scenery of a same type as scenery in the ground-view image.

The present disclosure further provides a non-transitory computer readable storage medium storing a program. The program that causes a computer to execute: performing a first phase training of a discriminator, the discriminator acquiring a ground-view image and an aerial-view image and determining whether the acquired ground-view image matches the acquired aerial-view image; and performing a second phase training of the discriminator.

The first phase training is performed using a ground-view image, a positive example of the aerial-view image, and a first level negative example of the aerial-view image, the first level negative example of the aerial-view image including scenery of a different type from scenery in the ground-view image.

The second phase training is performed using the ground-view image, a positive example of the aerial-view image, and a second level negative example of the aerial-view image, the second level negative example of the aerial-view image including scenery of a same type as scenery in the ground-view image.

Advantageous Effects of Invention

According to the present disclosure, it is possible to provide a technique to improve accuracy of a discriminator that performs matching between a ground-view image and an aerial-view image.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary.

First Example Embodiment

Figure 1:
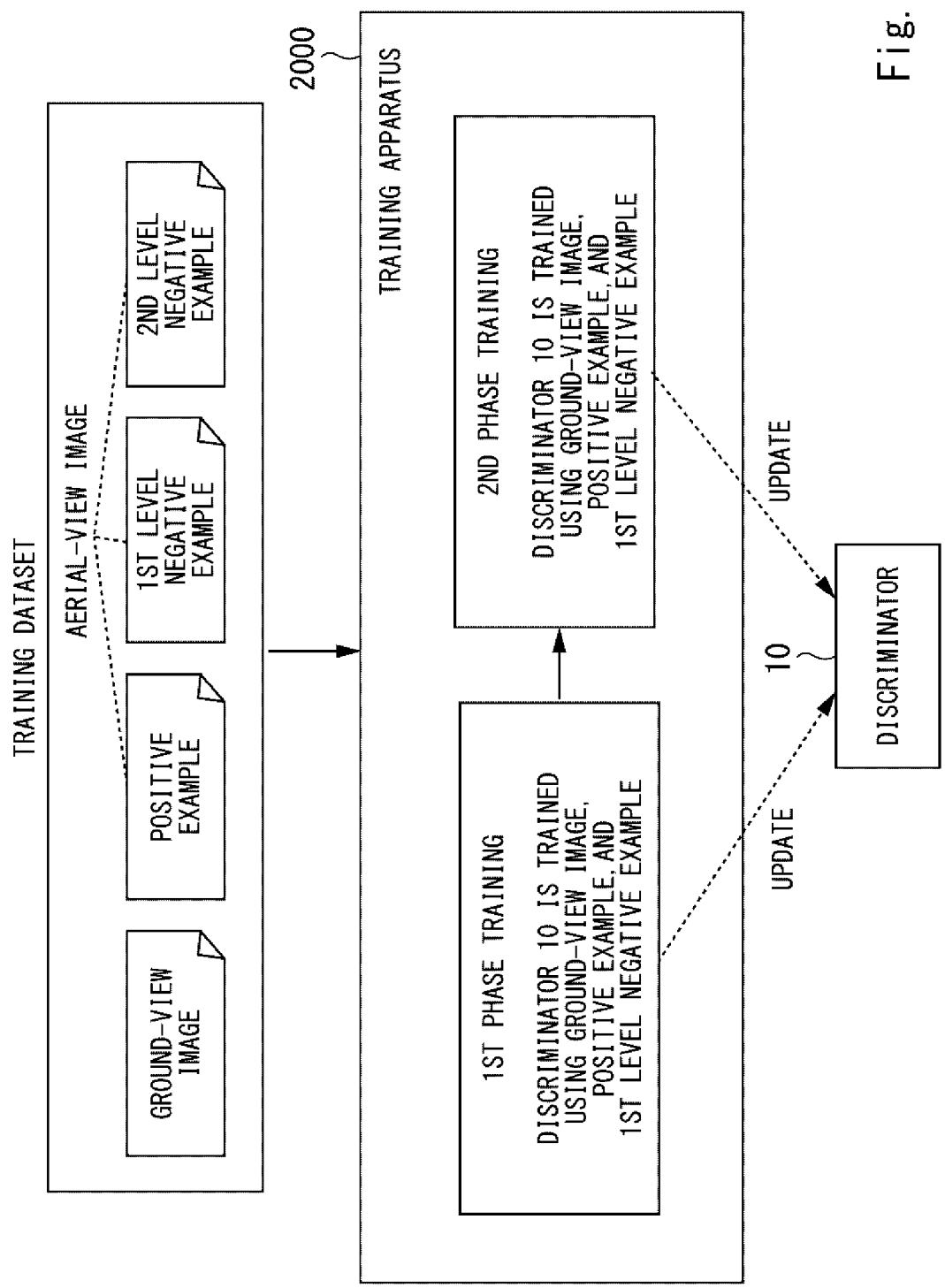
FIG. 1 illustrates an overview of a training apparatus according to the 1st example embodiment.

FIG. 1 illustrates an overview of a training apparatus 2000 according to the 1st example embodiment. Please note that FIG. 1 does not limit operations of the training apparatus 2000, but merely show an example of possible operations of the training apparatus 2000.

The training apparatus 2000 is used to train a discriminator 10. The discriminator 10 performs matching between a ground-view image and an aerial-view image (so-called ground-to-aerial cross-view matching). The ground-view image is an image including a ground view of a place. For example, the ground-view image is captured by pedestrians, cars, and etc. The ground-view image may be panoramic in nature (having 360-degree field of view), or may have limited (less than 360-degree) field of view. The aerial-view image is an image including a top view of a place. For example, the aerial-view image is captured by a drone, air plane, satellite, and etc. Specifically, the discriminator 10 acquires a ground-view image and an aerial-view image, and determines whether the acquired ground-view image matches the acquired aerial-view image. Note that "the ground-view image matches the aerial-view image" means that the location where the ground-view image is captured is included in the aerial-view image.

Note that the discriminator 10 may be implemented in the training apparatus 2000 or in another apparatus. In FIG. 1, it is shown that the discriminator 10 is implemented outside the training apparatus 2000.

The training apparatus 2000 trains the discriminator 10 so that the discriminator 10 can perform the above-mentioned matching. Specifically, the training apparatus 2000 acquires one or more training datasets to be used for the training of the discriminator 10. The training dataset includes a ground-view image, a positive example of an aerial-view image (hereinafter, positive example), a 1st level negative example of an aerial-view image (hereinafter, 1st level negative example), and a 2nd level negative example of an aerial-view image (hereinafter, 2nd level negative example). The positive example is an aerial-view image that matches the corresponding ground-view image (the ground-view image included in the training dataset together with that positive example). On the other hand, the negative example is an aerial-view image that does not match the corresponding ground-view image (the ground-view image included in the training dataset together with that negative example).

The degree of similarity of the 1st level negative example to the ground-view image is different from the degree of similarity of the 2nd level negative example to the ground-view image. Specifically, the 1st level negative example includes scenery of a different type from that included in the corresponding ground-view image, whereas the 2nd level negative example includes scenery of the same type as that included in the corresponding ground-view image. This means that the degree of similarity of the 1st level negative example to the corresponding ground-view image is lower than the degree of similarity of the 2nd level negative example to the corresponding ground-view image.

Suppose that the training dataset S1 includes the ground-view image G1, the positive example P1, the 1st level negative example N1, and the 2nd level negative example N2. In addition, the type of scenery in the ground-view image G1, (also in the positive example P1) is "a residential area." In this case, the 1st level negative example N1 includes scenery whose type is not "a residential area", such as "a Freeway", "an Overpass", or "a Roundabout." On the other hand, the 2nd level negative example N2 includes scenery whose type is "a residential area."

Figure 2:
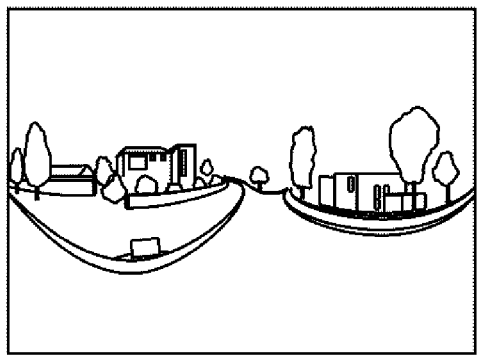
FIG. 2 illustrates an example of the training dataset used for training the discriminator.
Figure 2:
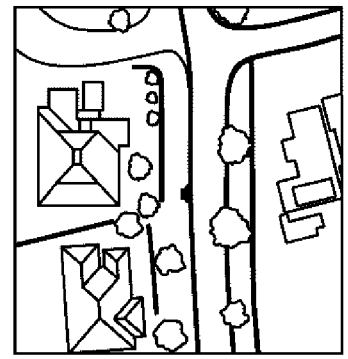
Figure 2:
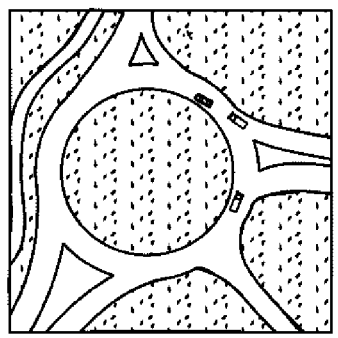
Figure 2:
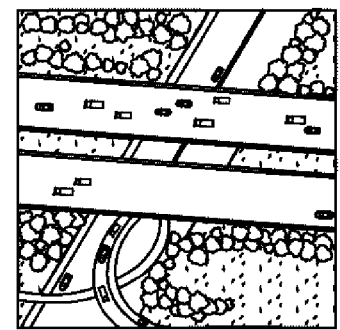
Figure 2:
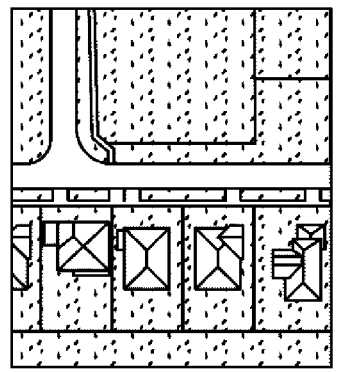

FIG. 2 illustrates an example of the training dataset used for training the discriminator 10. The ground-view image includes a place that is classified as "a residential area" and the positive example includes the same place. The scenery included in the 2nd level negative example is also classified as "a residential area," but the captured place is different from that of the ground-view image or the positive example. The scenery included in the 1st level negative example is not classified as "a residential area": "roundabout" and "overpass".

The training of the discriminator 10 performed by the training apparatus 2000 includes 1st phase training and 2nd phase training. In the 1st phase training, one or more sets of the ground-view image, the positive example, and the 1st level negative example is used to train the discriminator 10. In the 2nd phase training, one or more sets of the ground-view image, the positive example, and the 1st level negative example is used to train the discriminator 10.

Example of Advantageous Effect

According to the training apparatus 2000 of the present example embodiment, the discriminator 10 is trained using the 1st level negative example, which is an aerial-view image that includes scenery of a different type from that included in the corresponding ground-view image. Then, the discriminator 10 is trained using the 2nd level negative example, which is an aerial-view image that includes scenery of the same type as that included in the corresponding ground-view image.

A way of training a discriminator with multiple phases is called "curriculum learning." In curriculum learning, training of a discriminator is divided into multiple phases, and training data used in each phase differs in the degree of difficulty of discrimination of the data. Specifically, the earlier a training phase is, the easier it is to discriminate a training data used in that phase. In terms of the training performed by the training apparatus 2000, it is easier to discriminate the 1st level negative example than the 2nd level negative example since the type of scenery in the 1st level negative example is different from that in the ground-view image whereas the type of scenery in the 2nd level negative example is the same as that in the ground-view image.

By applying a concept of the curriculum learning to the training of the discriminator 10, the training apparatus 2000 can train the discriminator 10 to be capable of performing matching between a ground-view image and an aerial-view image more accurately than a discriminator that is trained without curriculum learning.

Hereinafter, more detailed explanation of the training apparatus 2000 will be described.

<Example of Functional Configuration>

Figure 3:
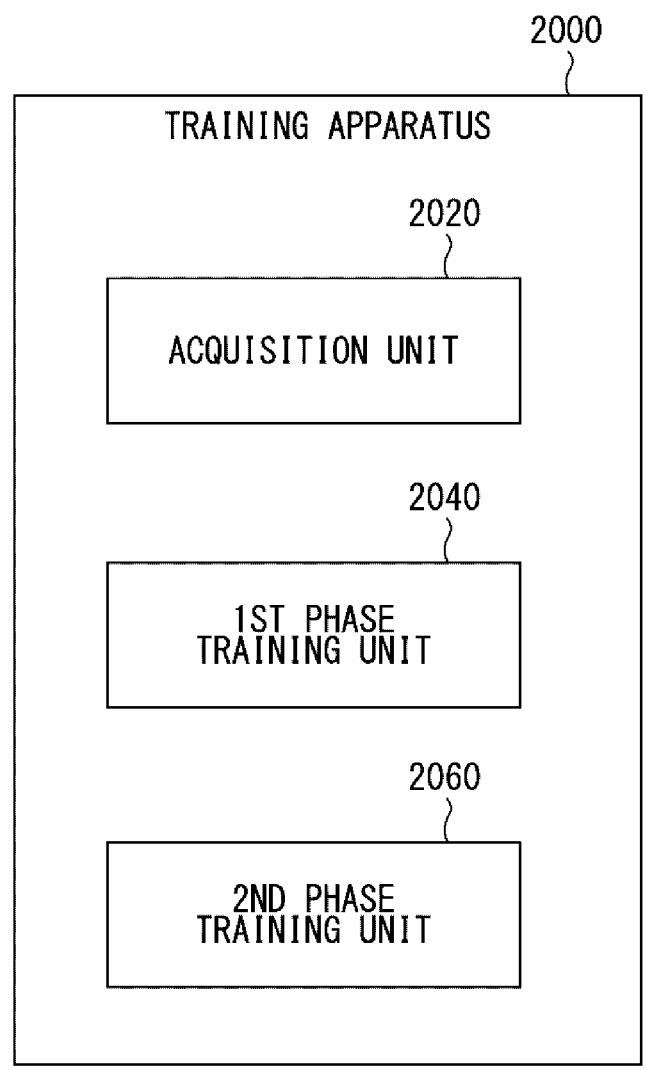
FIG. 3 is a block diagram illustrating an example of the functional configuration of the training apparatus of the 1st example embodiment.

FIG. 3 is a block diagram illustrating an example of the functional configuration of the training apparatus 2000 of the 1st example embodiment. The training apparatus 2000 includes an acquisition unit 2020, a 1st phase training unit 2040, and a 2nd phase training unit 2060. The acquisition unit 2020 acquires the training dataset. The 1st phase training unit 2040 performs the 1st phase training of the discriminator 10 using the ground-view image, the positive example, and the 1st level negative example included in the acquired training dataset. The 2nd phase training unit 2060 performs the 2nd phase training of the discriminator 10 using the ground-view image, the positive example, and the 2nd level negative example included in the acquired training dataset.

<Example of Hardware Configuration of Training Apparatus 2000>

The training apparatus 2000 may be realized by one or more computers. Each of the one or more computers may be a special-purpose computer manufactured for implementing the training apparatus 2000, or may be a general-purpose computer like a personal computer (PC), a server machine, or a mobile device. The training apparatus 2000 may be realized by installing an application in the computer. The application is implemented with a program that causes the computer to function as the training apparatus 2000. In other words, the program is an implementation of the functional units of the training apparatus 2000.

Figure 4:
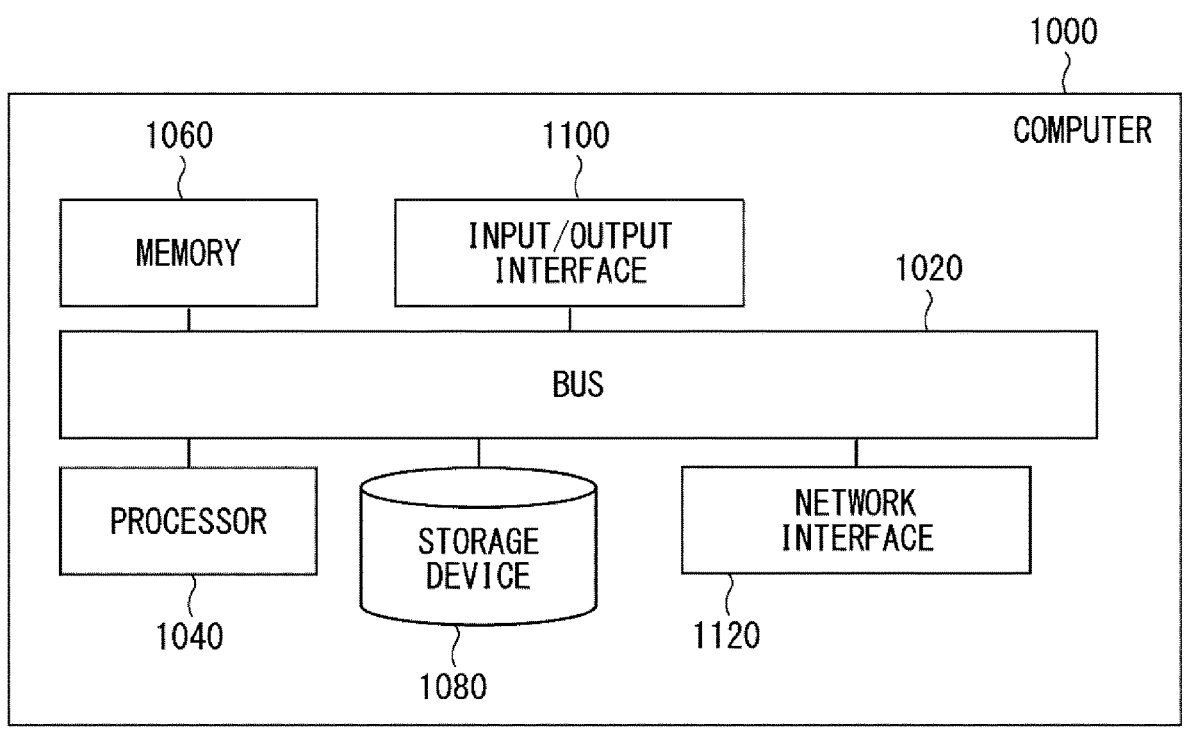
FIG. 4 is a block diagram illustrating an example of the hardware configuration of a computer realizing the training apparatus.

FIG. 4 is a block diagram illustrating an example of the hardware configuration of a computer 1000 realizing the training apparatus 2000. In FIG. 4, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a key-board, mouse, or display device. The network interface 1120 is an interface between the computer 1000 and a network. The network may be a LAN (Local Area Network) or a WAN (Wide Area Network).

The storage device 1080 may store the program mentioned above. The processor 1040 executes the program to realize each functional unit of the training apparatus 2000. In addition, the storage device 1080 may store the training dataset, the discriminator 10 (the program of the discriminator 10 and parameters used by it), or both.

The hardware configuration of the computer 1000 is not limited to the configuration shown in FIG. 4. For example, as mentioned-above, the training apparatus 2000 may be realized by plural computers. In this case, those computers may be connected with each other through the network.

<<Hardware Configuration for Discriminator 10>>

As described above, the discriminator 10 may be implemented in the training apparatus 2000 or in another apparatus. In latter case, another computer is used to implement the apparatus in which the discriminator 10 is implemented. The hardware configuration of this compute may have similar configuration to the computer 1000 shown in FIG. 4.

<Flow of Process>

Figure 5:
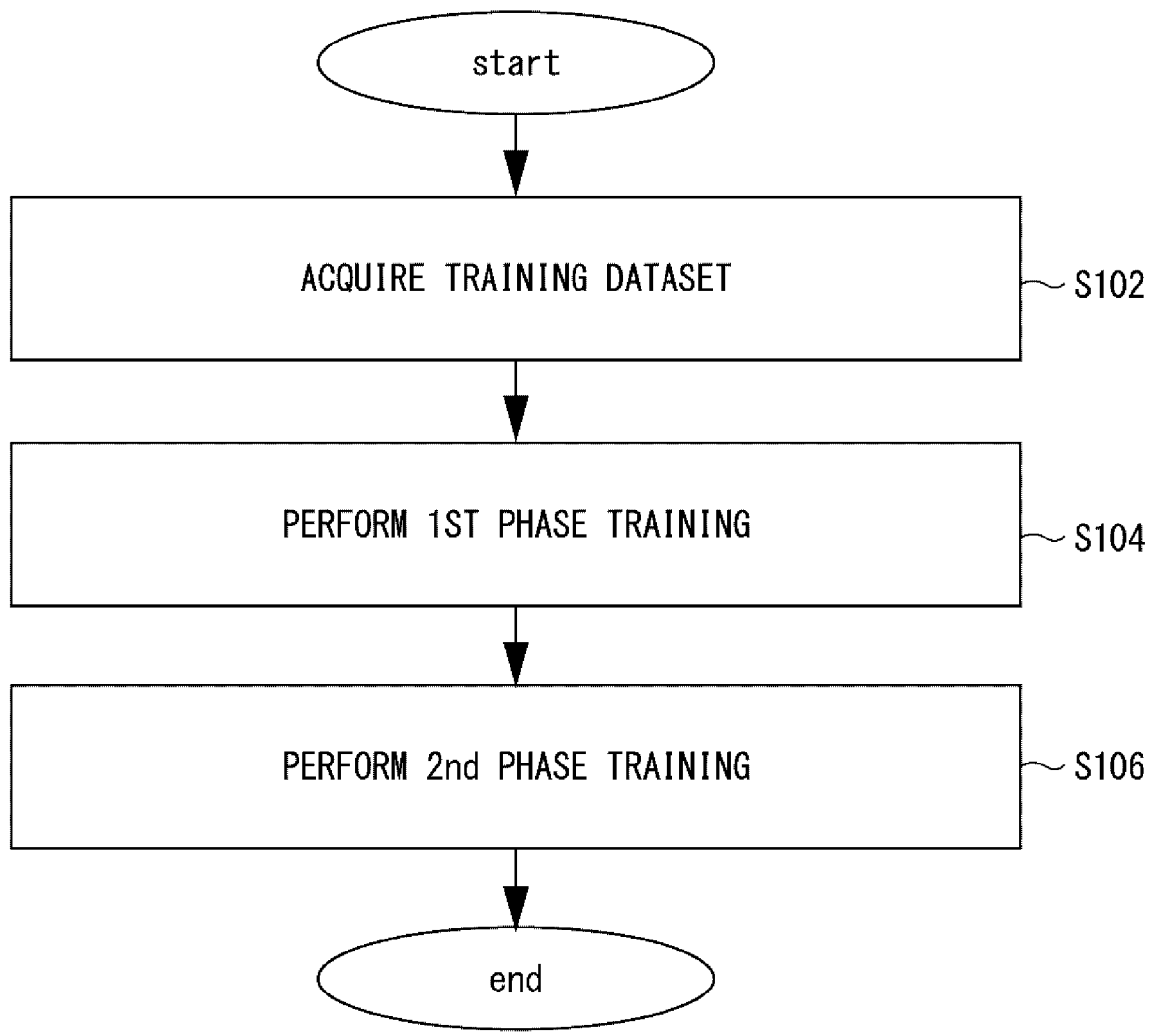
FIG. 5 is a flowchart illustrating an example flow of processes that the training apparatus of the 1st example embodiment performs.

FIG. 5 is a flowchart illustrating an example flow of processes that the training apparatus 2000 of the 1st example embodiment performs. The acquisition unit 2020 acquires one or more training datasets (S102). The 1st phase training unit 2040 performs the 1st phase training of the discriminator 10 (S104). The 2nd phase training unit 2060 performs the 2nd phase training of the discriminator 10 (S106).

<Details of Discriminator 10>

The discriminator 10 acquires a ground-view image and an aerial-view image, and determines whether the ground-view image matches the aerial-view image. This determination may be realized in various ways. For example, the discriminator 10 extract features of the ground-view image and features of the aerial-view image, and calculate degree of similarity between the features of the ground-view image and the features of the aerial-view image. If the calculated degree of similarity is high (for example, greater than or equal to a pre-defined threshold), it is determined that the ground-view image matches the aerial-view image. On the other hand, if the calculated degree of similarity is low (for example, less than the pre-defined threshold), it is determined that the ground-view image does not match the aerial-view image.

There may be various implementations of the discriminator 10. For example, the discriminator 10 may be configured with one or more neural networks. The Siamese network disclosed by NPL1 may be used as an example of a concrete implementation of the discriminator 10.

Figure 6:
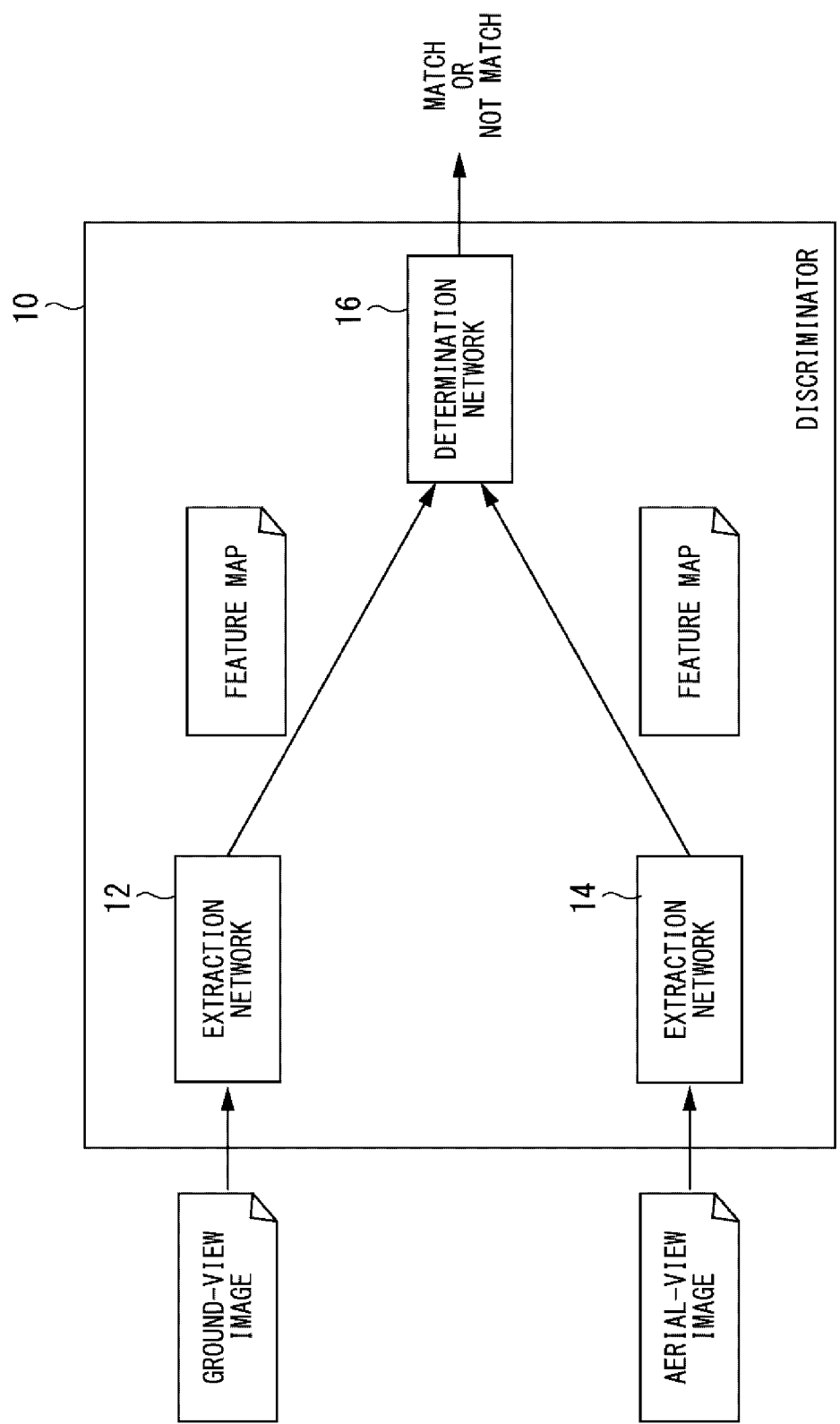
FIG. 6 illustrates a basic structure of the discriminator that is implemented with neural networks.

FIG. 6 illustrates a basic structure of the discriminator 10 that is implemented with neural networks. The discriminator 10 includes an extraction network 12, an extraction network 14, and a determination network 16. The extraction network 12 is a neural network that acquires a ground-view image, generates one or more feature maps of the ground-view image (i.e. extracts features of the ground-view image), and outputs the generated feature maps. The extraction network 14 is a neural network that acquires an aerial-view image, generates one or more feature maps of the aerial-view image (i.e. extracts features of the aerial-view image), and outputs the generated feature maps.

The feature maps of the ground-view image and those of the aerial-view image are fed into the determination network 16. The determination network 16 analyzes the fed feature maps, and outputs data (e.g. flag) that represents whether or not the ground-view image matches the aerial-view image.

<<Example Application of Discriminator 10>>

There are various applications of the discriminator 10. For example, the discriminator 10 can be used as a part of a system (hereinafter, a geo-localization system) that performs image geo-localization. Image geo-localization is a technique to determine the place at which an input image is captured. Note that, the geo-localization system is merely an example of the application of the discriminator 10, and the application of the discriminator 10 is not limited to being used in the geo-localization system.

Figure 7:
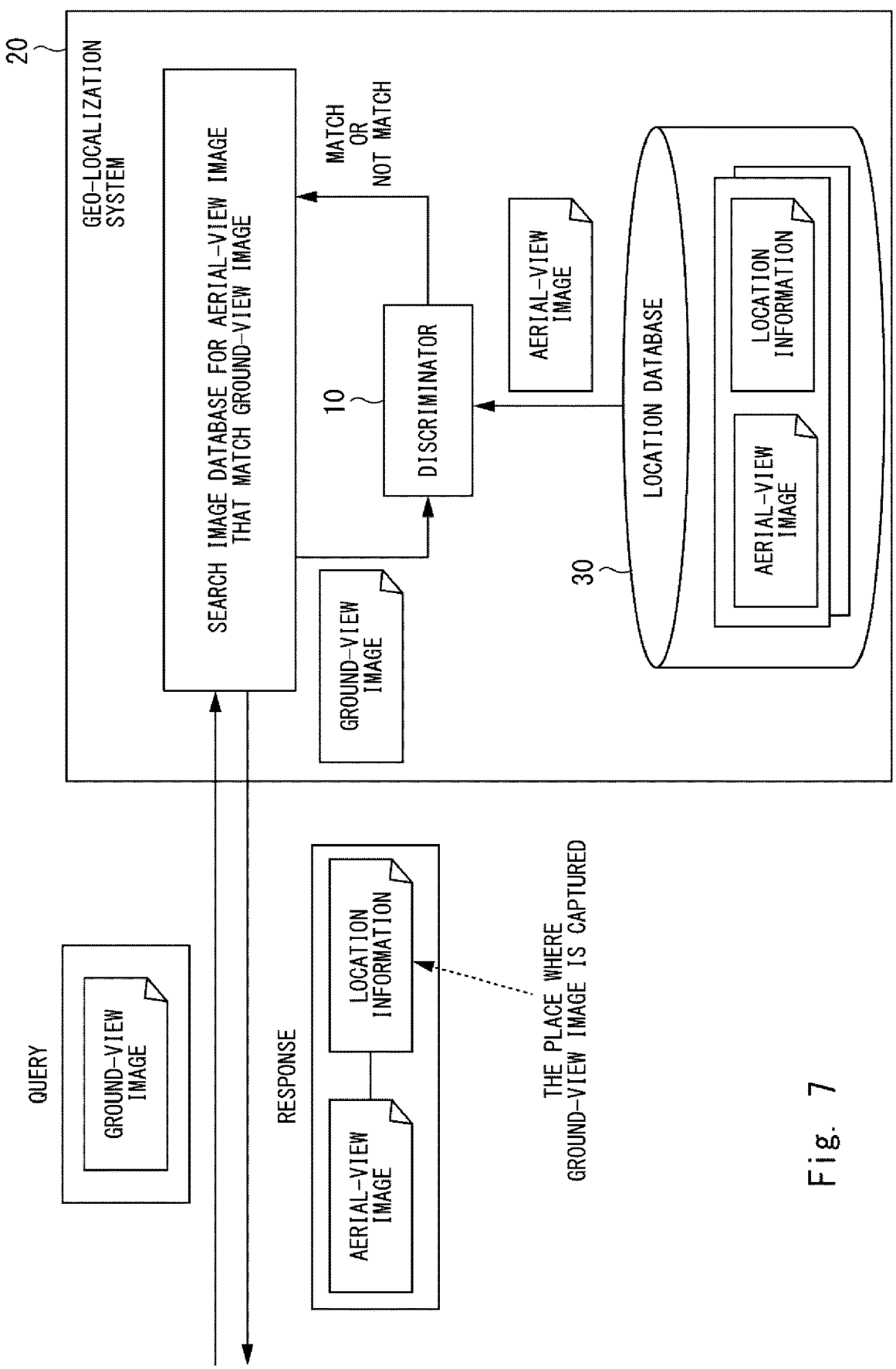
FIG. 7 illustrates a geo-localization system that includes the discriminator.

FIG. 7 illustrates a geo-localization system 20 that includes the discriminator 10. The geo-localization system 20 includes the discriminator 10 and the location database 30. The location database 30 includes a plurality of aerial-view images to each of which location information is attached. An example of the location information may be a GPS (Global Positioning System) coordinate of the place captured in the corresponding aerial-view image.

The geo-localization system 20 receives a query that includes a ground-view image from a client (e.g. user terminal), and searches the location database 30 for the aerial-view image that matches the ground-view image in the received query, thereby determining the place at which the ground-view image is captured. Specifically, until the aerial-view image that matches the ground-view image in the query is detected, the geo-localization system 20 repeatedly executes to: acquire one of the aerial-view images from the location database 30; input the ground-view image and the acquired aerial-view image into the discriminator 10; and determine whether the output of the discriminator 10 indicates that the ground-view image matches the aerial-view image. By doing so, the geo-localization system 20 can find the aerial-view image that includes the place at which the ground-view image is captured. Since the detected aerial-view image is associated with the location information such as the GPS coordinate, the geo-localization system 20 can recognize that where the ground-view image is captured is the place that is indicated by the location information associated with the aerial-view image that matches the ground-view image.

Note that the geo-localization system 20 may be implemented by one or more arbitrary computers such as ones depicted in FIG. 4.

<Acquisition of Training Data: S102>

The acquisition unit 2020 acquires one or more training datasets (S102). As described above, the training dataset includes the ground-view image, the positive example, the 1st level negative example, and the 2nd level negative example. Note that, a plurality of 1st level negative examples may be included in the training dataset. Similarly, a plurality of 2nd level negative examples may be included in the training dataset. Hereinafter, examples of ways to acquire the training dataset will be explained.

The positive example in a training dataset has to match the ground-view image in the same training dataset. On the other hand, the negative examples in a training dataset must not match the ground-view image in the same training dataset. In order to obtain a set of images meeting these conditions, for example, plural ground-view images and aerial-view images are prepared in advance in a storage device (hereinafter, image storage device) to which the training apparatus 2000 has access. Each image in the image storage device is associated with location information of the place at which that image is captured. As described above, the GPS coordinate is an example of the location information.

The training apparatus 2000 acquires arbitrary ground-view image from the image storage device. Then, the training apparatus 2000 acquires an aerial-view image whose location information represents the same location as or a location very close to the location represented by the location information of the acquired ground-view image. Note that "a location is very close to another location" may mean that the distance between these locations (e.g. GPS coordinates) is less than or equal to a predefined threshold.

As regards negative examples, the training apparatus 2000 acquires plural aerial-view images whose location information represent locations different from the location represented by the ground-view image. Note that "a location is different from another location" may mean that their locations (e.g. GPS coordinates) are not equal to each other, or that the distance between these locations is greater than the predefined threshold.

When preparing negative examples, the type of scenery in each negative example has to be taken into account. For example, in the image storage device, each aerial-view image may be stored in association with information (hereinafter, type information) that indicates a type of scenery included in that aerial-view image. In this case, the training apparatus 2000 acquires, as the 1st level negative examples, one or more aerial-view images whose type information indicates a different type of scenery from that indicated by the type information of the positive example. On the other hand, the training apparatus 2000 acquires, as the 2nd level negative examples, one or more aerial-view images whose type information indicates the same type of scenery as that indicated by the type information of the positive example.

The type information is not necessarily attached to the aerial-view image stored in the image storage device in advance. In the case where the type information is not attached to the aerial-view image, for example, the training apparatus 2000 acquires plural negative examples from the image storage device, and determine the type of scenery for each acquired negative example. Then, the training apparatus 2000 chooses one or more aerial-view images whose type of scenery is determined to be different from that of the positive example, as the 1st level negative example. On the other hand, the training apparatus 2000 chooses one or more aerial-view images whose type of scenery is determined to be the same as that of the positive example, as the 2nd level negative example.

The above determination of a scenery type of the negative examples is realized in various ways. For example, the training apparatus 2000 further comprises a scenery classifier, which is a classifier trained in advance to be capable of determining the type of scenery included in an aerial-view image input thereto among predefined multiple types of scenery. In this case, the training apparatus 2000 inputs plural aerial-view images into the scenery classifier in turn, thereby recognizing the type of scenery include in the respective aerial-view images.

<1st Phase Training: S104>

The 1st phase training unit 2040 performs the 1st phase training of the discriminator 10. Hereinafter, an example of a way of doing the 1st phase training will be described.

For example, the 1st phase training unit 2040 may input the ground-view image and the positive example into the discriminator 10, and update parameters of the discriminator 10 using the output from the discriminator 10. Similarly, the 1st phase training unit 2040 may input the ground-view image and the 1st level negative example into the discriminator 10, and update parameters of the discriminator 10 using the output from the discriminator 10. If the training dataset includes a plurality of the 1st level negative examples, each of the 1st level negative examples is used in turn.

Suppose that the discriminator 10 is formed as a set of neural networks shown in FIG. 6. In this case, in each iteration of training (updating) the discriminator 10, the 1st phase training unit 2040 performs as follows. First, the 1st phase training unit 2040 trains the set of neural networks using the ground-view image, the positive example, and a loss function for the positive example (hereinafter, positive loss function). The positive loss function is designed so that the discriminator 10 can be trained to successfully output larger degree of similarity for the ground-view image and the positive example. Specifically, the 1st phase training unit 2040 inputs the ground-view image and the positive example into the extraction network 12 and the extraction network 14, respectively. Then, the 1st phase training unit 2040 inputs an output from the set of neural networks into the positive loss function, and updates the parameters (weights) assigned to the respective connections between nodes in the neural networks constituting the discriminator 10 based on the calculated loss.

Second, the 1st phase training unit 2040 trains the set of neural networks using the ground-view image, the negative example, and a loss function for the negative example (hereinafter, negative loss function). The negative loss function is designed so that the discriminator 10 can be trained to successfully output smaller degree of similarity for the ground-view image and the negative example. Specifically, the 1st phase training unit 2040 inputs the ground-view image and the negative example into the extraction network 12 and the extraction network 14, respectively. Then, the 1st phase training unit 2040 inputs an output from the set of neural networks into the negative loss function, and updates the parameters (weights) assigned to the respective connections between nodes in the neural networks constituting the discriminator 10 based on the calculated loss.

Note that the 1st phase training can be done batch wise. Specifically, batch of positive examples are fed into the discriminator 10, and the loss for positive samples is updated. In addition, batch of negative examples are fed into the discriminator 10, the weights of the discriminator 10 are updated due to loss computed by using negative examples. Note that same applies for training in other phases.

<2nd Phase Training: S106>

The 2nd phase training unit 2060 performs the 2nd phase training of the discriminator 10 (S106). Except that the 2nd level negative example has to be used, the way of performing the 2nd phase training is the same as the way of performing the 1st phase training. Specifically, for example, the 2nd phase training unit 2060 may input the ground-view image and the positive example in the training dataset into the discriminator 10, and update parameters of the discriminator 10 using the output from the discriminator 10. Similarly, the 2nd phase training unit 2060 may input the ground-view image and the 2nd level negative example into the discriminator 10, and update parameters of the discriminator 10 using the output from the discriminator 10. If the training dataset includes a plurality of the 2nd level negative examples, each of the 2nd level negative examples is used in turn. Note that the 1st level negative example may be additionally used for the 2nd phase training in the same manner as the 1st phase training.

<Additional Data for Matching>

The discriminator 10 may use additional data to perform matching between a ground-view image and an aerial-view image. An example of the additional data is orientation information. The orientation information corresponding to a ground-view image may represent a set of an azimuthal angle and an altitude angle for each part of the image. On the other hand, the orientation information corresponding to an aerial-view image may represent a set of a radial distance and an azimuthal angle for each part of the image. An example of such orientation information is described in NPL1.

In the case where the discriminator 10 uses the orientation information, the orientation information is also used in the training of discriminator 10. Thus, the training dataset includes not only the images, but also the orientation information corresponding thereto. When training the discriminator 10, the ground-view image, the orientation information corresponding to the ground-view image, the aerial-view image, and the orientation information corresponding to the aerial-view image are fed into the discriminator 10. Then, the training apparatus 2000 updates the parameters of the discriminator 10 using the loss calculated based on the output from the discriminator 10.

<Output from Training Apparatus 2000>

The training apparatus 2000 may output the result of the training of the discriminator 10. The result of the training may be output in an arbitrary manner. For example, the training apparatus 2000 may put trained parameters (e.g. weights assigned to respective connections of neural networks) of the discriminator 10 into a storage device, or send the trained parameters to an apparatus in which the discriminator 10 is used. Note that not only the parameters but also the program implementing the discriminator 10 may be output.

In the case where the discriminator 10 is implemented in the training apparatus 2000, the training apparatus may not output the result of the training. In this case, from the viewpoint of the user of the training apparatus 2000, it is preferable that the training apparatus 2000 notifies the user that the training of the discriminator 10 has finished.

Second Example Embodiment

Figure 8:
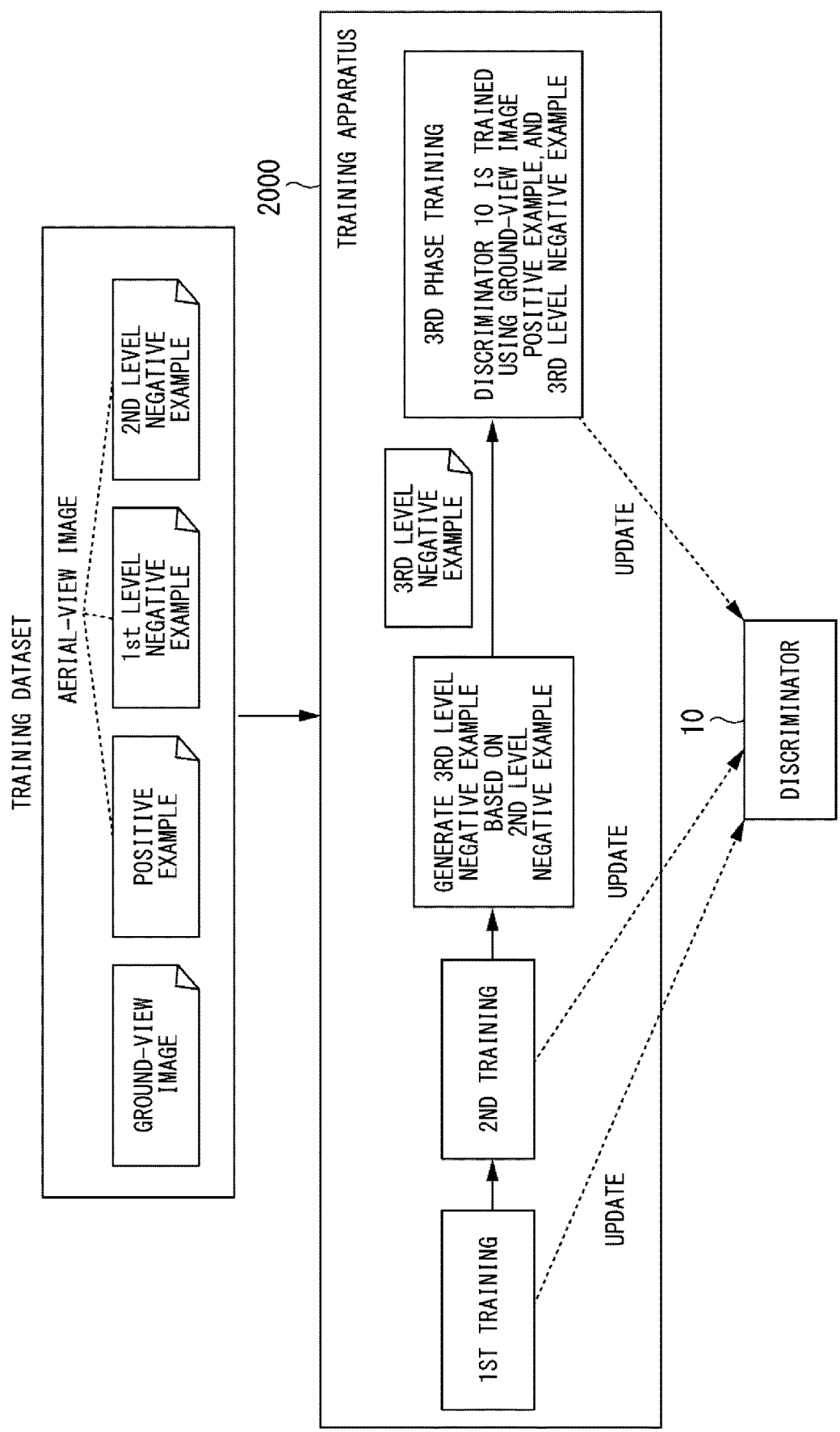
FIG. 8 illustrates an overview of a training apparatus according to the second example embodiment.

FIG. 8 illustrates an overview of a training apparatus 2000 according to the second example embodiment. Please note that FIG. 8 does not limit operations of the training apparatus 2000, but merely show an example of possible operations of the training apparatus 2000. In addition, except for the matters explained later, the training apparatus 2000 of the 2nd example embodiment may have the same functions as those of the training apparatus 2000 of the 1st example embodiment.

In addition to the 1st phase training and the 2nd-phase training, the training apparatus 2000 of the 2nd example embodiment further performs the 3rd phase training of the discriminator 10. The 3rd phase training is performed using the ground-view image, the positive example, and the 3rd level negative example of an aerial-view image (hereinafter, 3rd level negative example). The 3rd level negative example is generated based on the 2nd level negative example so that its degree of similarity to the ground-view image is greater than the degree of similarity between 2nd level negative example and the ground-view image.

Note that the 3rd level negative example may be generated manually by a user or automatically by a computer. FIG. 8 depicts the case where the 3rd level example is generated by the training apparatus 2000. By generating the 3rd level negative example automatically, it is possible to reduce the burden on the user of the training apparatus 2000.

Example of Advantageous Effect

The training of the discriminator 10 performed by the training apparatus 2000 of the 2nd example embodiment includes a greater number of phases than that performed by the training apparatus 2000 of the 1st example embodiment. Thus, the training apparatus 2000 of the 2nd example embodiment can train the discriminator 10 to be capable of performing matching between a ground-view image and an aerial-view image more accurately than the discriminator 10 trained by the training apparatus 2000 of the 1st example embodiment.

<Example of Functional Configuration>

Figure 9:
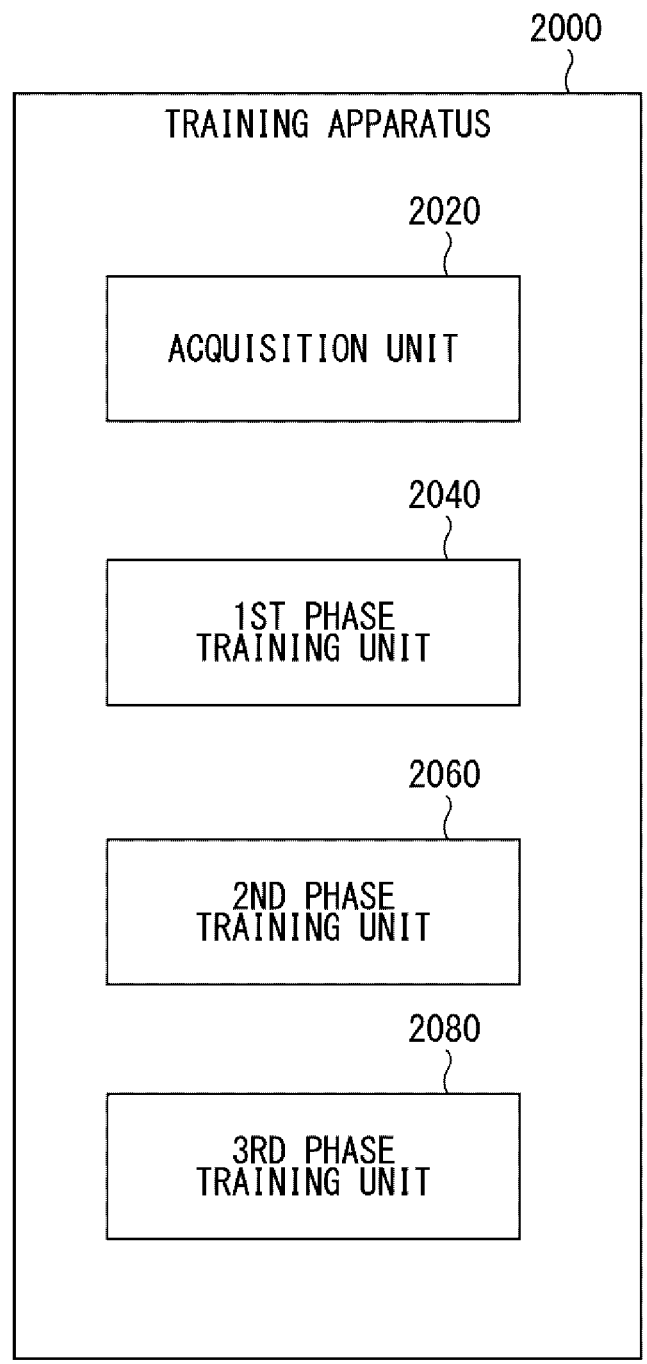
FIG. 9 is a block diagram illustrating an example of a functional configuration of the training apparatus of the 2nd example embodiment.

FIG. 9 is a block diagram illustrating an example of a functional configuration of the training apparatus 2000 of the 2nd example embodiment. The training apparatus 2000 of the 2nd example embodiment further includes a 3rd phase training unit 2080. The 3rd phase training unit 2080 performs the 3rd phase training of the discriminator 10 using the ground-view image, the positive example, and the 3rd level negative example.

<Example of Hardware Configuration>

The hardware configuration of the training apparatus 2000 of the 2nd example embodiment may be illustrated by FIG. 4, similarly to that of the training apparatus 2000 of the 1st example embodiment. However, the storage device 1080 of the 2nd example embodiment stores the program that implements the functions of the training apparatus 2000 of the 2nd example embodiment.

<Flow of Process>

Figure 10:
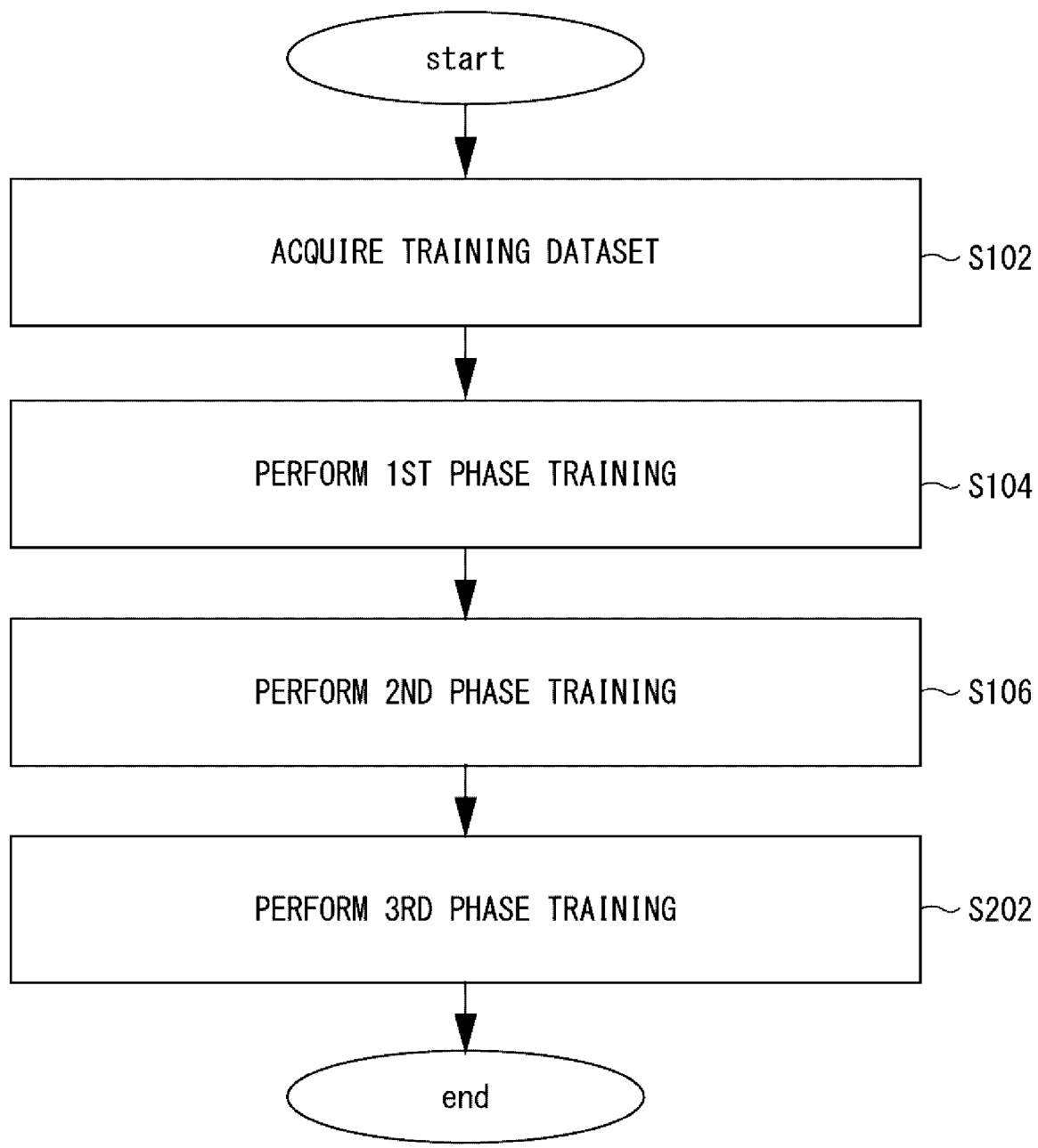
FIG. 10 is a flow chart illustrating a flow of processes that the training apparatus of the 2nd example embodiment performs.

FIG. 10 is a flow chart illustrating a flow of processes that the training apparatus 2000 of the 2nd example embodiment performs. After the 2nd phase training, the 3rd phase training unit 2080 performs the 3rd phase training using the 3rd level negative example (S202).

<As to 3rd Level Negative Example>

As described above, the 3rd level negative example is an aerial-view image that is generated based on the 2nd level negative example so that the degree of similarity of the 3rd level negative example to the ground-view image is greater than the degree of similarity of 2nd level negative example to the ground-view image. The degree of similarity of a ground-view image to an aerial-view image is based on similarities between their features, such as a position, orientation, and size of each object included in the images. The object included in the image may be a road, a building, a parking lot, an arrow mark, a sign board, vegetation, and so on. In another example, the features of the images may be a position, orientation, and size of lines or edges in the images.

Thus, for example, the 3rd level negative example is generated by modifying the 2nd level negative example so that one or more of the above-mentioned features of that 2nd level negative example become more similar to those of the ground-view image. In the case where the 3rd phase training unit 2080 generates the 3rd level negative example, for example, the 3rd phase training unit 2080 extracts features of the ground-view image and features of the 2nd level negative example, generates transformation parameters by comparing these features, and generates the 3rd level negative example by transforming the 2nd level negative example based on the transformation parameters.

The transformation parameters represent transformation to be applied to the 2nd level negative example. Examples of the transformation may crop, affine transformation, color modification, and image inpainting (filling holes in images, blank regions, or missing pixel values). The transformation parameters regarding crop operation may represent which part of the 2nd level negative example is to be cropped. The transformation parameters regarding affine transformation may represents an affine transformation matrix that is used for an affine transformation to be applied to the 2nd level negative example.

The transformation parameters regarding color modification may represent sets of a location (xy co-ordinate) of pixel of the 2nd level negative example whose color needs to be modified and modification parameters representing color modification to be applied to the corresponding pixel. Modification parameters may represent modification in color features, such as intensity, hue, and lightness. For example, the parameter generation unit 2086 that handles color modification may include two neural networks. The first one is trained to automatically find the locations of pixels of the 2nd level negative example that need to be modified. The second one is trained to automatically determine how to change a color of each pixel that is determined to be modified by the first neural network.

The transformation parameters regarding image inpainting may represent sets of a location (xy co-ordinate) of a target pixel of the 2nd level negative example, and a new pixel value to be set to the corresponding pixel. For example, the parameter generation unit 2086 that handles image inpainting may include two neural networks. The first one is trained to automatically find the locations of target pixels. After finding the target pixels, the pixel values of the respective target pixels are set to 0 (black color). The second neural network is trained to automatically change a pixel value of each target pixel to new one.

The generation of the 3rd level negative example from the 2nd level negative example may include multiple affine transformations. In this case, the transformation parameters may include multiple affine transformation matrices. The 3rd level negative example may be generated, for example, as a weighted combination or average of the multiple transformed images.

The transformation to be applied to the 2nd level negative example is not limited to ones explained above. For example, GAN (generative adversarial network) may be used to generate the 3rd level negative example.

Figure 11:
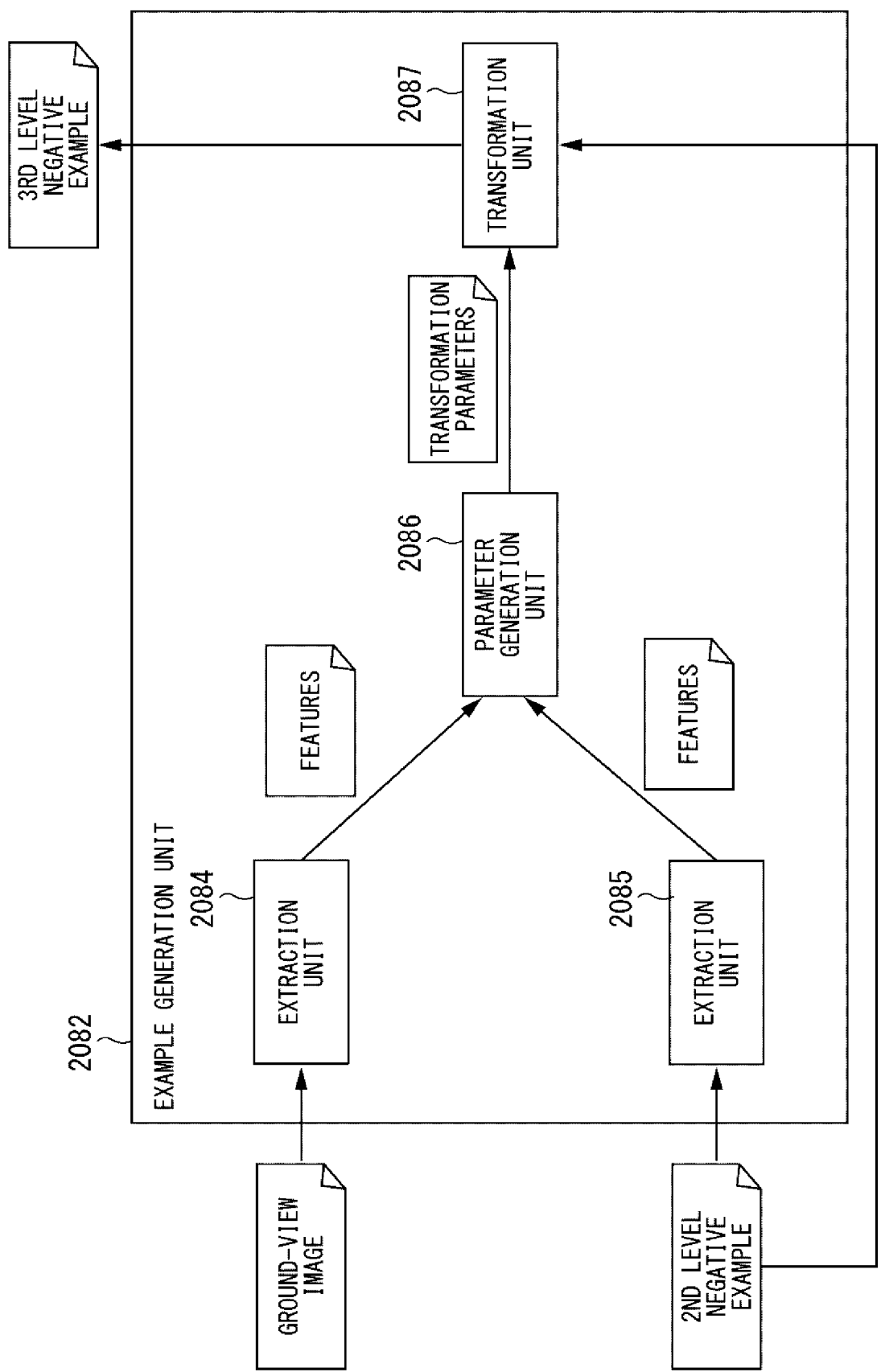
FIG. 11 illustrates an implementation of an example generation unit.

FIG. 11 illustrates an implementation of an example generation unit 2082. The example generation unit 2082 is a functional unit that generates the 3rd negative example. The example generation unit includes an extraction unit 2084, an extraction unit 2085, a parameter generation unit 2086, and transformation unit 2087. The extraction unit 2084 acquires the ground-view image, and extracts features (e.g. one or more feature maps) of the ground-view image. An example implementation of the extraction unit 2084 is a neural network, such as a CNN. Note that, the features extracted by the extraction unit 2084 may be the same as or different from the feature maps generated by the extraction network 12 shown in FIG. 6.

The extraction unit 2085 acquires the 2nd level negative example, and extracts features (e.g. one or more feature maps) of the 2nd level negative example. An example implementation of the extraction unit 2085 is also a neural network, such as a CNN. Note that, the features extracted by the extraction unit 2085 may be the same as or different from those generated by the extraction network 14 shown in FIG. 6.

The parameter generation unit 2086 acquires the output from the extraction unit 2084 (i.e. the features of the ground-view image) and the output from the extraction unit 2085 (i.e. the features of the 2nd level negative example), and generates the transformation parameters. The transformation parameters may be formed as, for example, one or more matrices. An example implementation of the parameter generation unit 2086 is a neural network.

The transformation unit 2087 acquires the transformation parameters and the same 2nd level negative example as that fed into the extraction unit 2085, and transforms the 2nd level negative example using the transformation parameters, thereby generating the 3rd level negative example. Suppose that the transformation parameters are divided into first parameters for crop operation and second parameters for affine transformation. In this case, for example, the transformation unit 2087 uses the 1st parameters to perform a crop operation on the 2nd level negative example, and then uses the 2nd parameters to perform an affine transformation on the image region cropped from the 2nd level negative example based on the 1st parameters.

The extraction unit 2084, the extraction unit 2085, and parameter generation unit 2086 are trained in advance so that they operate as described above. Theoretically, the 3rd level negative example should be generated as an aerial-view image that is determined to match the ground-view image by the discriminator 10 that has trained till the 2nd phase training even though that aerial-view image does not match the ground-view image in reality. Thus, for example, the quality of an aerial-view imaged generated by the example generation unit 2082 may be evaluated using a pretrained discriminator (e.g. Siamese network) that have been trained till the 2nd phase training. This pretrained discriminator works in a similar manner to the discriminator 10.

In order for the evaluation, the ground-view image and the aerial-view image generated by the example generation unit 2082 under training are input to the pretrained discriminator. The example generation unit 2082 is trained (the weights in the extraction unit 2084, the extraction unit 2085, and the parameter generation unit 2086 are updated) so that the degree of similarity calculated by the pretrained discriminator becomes higher enough that the aerial-view image generated by the example generation unit 2082 is determined to match the ground-view image by the pretrained discriminator.

Note that the example generation unit 2082 may further use the positive example to generate the 3rd level negative example. In this case, the example generation unit 2082 includes another extraction unit that extracts features from the positive example. The parameter generation unit 2086 takes the features extracted from the ground-view image, those extracted from the 2nd level negative example, and those extracted from the positive example, and generates the transformation parameters based on those fed features.

As described above, the 3rd level negative example may be manually generated. In this case, for example, the example generation unit 2082 may provide a user with the ground-view image and the 2nd level negative example, and let the user use an image editing application to edit the 2nd level negative example. The example generation unit 2082 acquires the image edited by the user as the 3rd level negative example.

In another example, the 3rd level negative example may be generated outside the training apparatus 2000. For example, the example generation unit 2082 is implemented in another apparatus (hereinafter, example generation apparatus). In this case, for example, the training apparatus 2000 sends a request to the example generation apparatus, the request including the ground-view image and the 2nd level negative example. The example generation apparatus receives the request, generates the 3rd level negative example by inputting the ground-view image and the 2nd level negative example into the example generation unit 2082, and sends a response including the generated 3rd level negative to the training apparatus 2000.

In another example, the 3rd level negative example may be included in the training dataset that the acquisition unit 2020 acquires. In other words, the 3rd level negative example may be prepared in advance. In this case, the 3rd level negative example may be generated manually by a user or automatically by the example generation apparatus.

<3rd Phase Training: S202>

The 3rd phase training unit 2080 performs the 3rd phase training of the discriminator 10 (S202). The 3rd phase training is different from the 1st phase and the 2nd phase training in that, in the 3rd phase training, the 3rd level negative example is used for training. Thus, except that the 3rd level negative example is used instead of the 1st level negative example or the 2nd level negative example, the way of performing the 3rd phase training is the same as the way of performing 1st phase training and the 2nd phase training. Specifically, for example, the 3rd phase training unit 2080 may input the ground-view image and the positive example in the training dataset into the discriminator 10, and update parameters of the discriminator 10 using the output from the discriminator 10. Similarly, the 3rd phase training unit 2080 may input the ground-view image and the 3rd level negative example into the discriminator 10, and update parameters of the discriminator 10 using the output from the discriminator 10.

Note that, there may be a plurality of the 3rd level negative examples. For example, if the training dataset includes a plurality of the 2nd level negative examples, the example generation unit 2082 may generate a 3rd level negative example for each of the plurality of the 2nd level negative examples. In this case, the 3rd phase training unit 2080 trains the discriminator 10 using each of the plurality of the 3rd level negative examples in turn.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

Supplementary Notes

Supplementary Note 1

A training apparatus comprising:
at least one processor; and
memory storing instructions,
wherein the at least one processor is configured to execute the instructions to:
  perform a first phase training of a discriminator, the discriminator acquiring a ground-view image and an aerial-view image and determining whether the acquired ground-view image matches the acquired aerial-view image; and
  perform a second phase training of the discriminator,
the first phase training is performed using a ground-view image, a positive example of the aerial-view image, and a first level negative example of the aerial-view image, the first level negative example of the aerial-view image including scenery of a different type from scenery in the ground-view image; and
the second phase training is performed using the ground-view image, a positive example of the aerial-view image, and a second level negative example of the aerial-view image, the second level negative example of the aerial-view image including scenery of a same type as scenery in the ground-view image.

Supplementary Note 2

A training apparatus according to Supplementary Note 1,
wherein the at least one processor is further configured to:
  acquire a positive example of the aerial-view image and plural negative examples of aerial-view images;
  determine a type of scenery of each of the respective aerial-view images acquired;
  use the negative example of the aerial-view image whose scenery is determined to be a different type from the scenery of the positive example of the aerial-view image, as the first level negative example of the aerial-view image; and
  use the negative example of the aerial-view image whose scenery is determined to be a same type as the scenery of the positive example of the aerial-view image, as the second level negative example of the aerial-view image.

Supplementary Note 3

The training apparatus according to Supplementary Note 1 or 2,
wherein the at least one processor is further configured to:
  acquire a third negative example of the aerial-view image, whose degree of similarity to the ground-view image is higher than the degree of similarity of the second negative example of the aerial-view image to the ground-view image; and
  perform a third phase training of the discriminator using the ground-view image and the third negative example of the aerial-view image.

Supplementary Note 4

The training apparatus according to Supplementary Note 3,
wherein the at least one processor is further configured to:
  extract features of the ground-view image and the second level negative example of the aerial-view image;
  create transformation parameters based on the extracted features of the ground-view image and the 2nd level negative example of the aerial-view image; and
  acquire the 3rd level negative example by transforming the 2nd level negative example of the aerial-view image to the 3rd level negative example of the aerial-view image based on the transformation parameters.

Supplementary Note 5

The training apparatus according to Supplementary Note 4,
wherein the transformation includes a crop operation, an affine transformation, color modification, or image inpainting,
the transformation parameters specify a part of the 2nd level negative example of aerial-view image to be cropped, in the case where the transformation includes a crop operation,
the transformation parameters include a transformation matrix with which an affine transformation on the 2nd level negative example of the aerial-view image is performed, in the case where the transformation includes an affine transformation,
the transformation parameters include sets of location of pixel of the 2nd level negative example of the aerial-view image and modification in color features to be applied to the corresponding pixel, in the case where the transformation includes a color modification, and
the transformation parameters include sets of location of pixel of the 2nd level negative example of the aerial-view image and a new pixel value to be set to the corresponding pixel, in the case where the transformation includes an image inpainting.

Supplementary Note 6

The training apparatus according to any one of Supplementary Notes 1 to 5,
wherein the discriminator includes a first neural network, a second neural network, and a third neural network,
the first neural network acquires the ground-view image, and outputs feature maps of the ground-view image,
the second neural network acquires the aerial-view image, and outputs feature maps of the aerial-view image, and
the third neural network acquires the feature maps of the ground-view image and the feature maps of the aerial-view image, and outputs a data indicating whether the ground-view image matches the aerial-view image.

Supplementary Note 7

A control method performed by a computer, comprising:
performing a first phase training of a discriminator, the discriminator acquiring a ground-view image and an aerial-view image and determining whether the acquired ground-view image matches the acquired aerial-view image; and performing a second phase training of the discriminator,
wherein the first phase training is performed using a ground-view image, a positive example of the aerial-view image, and a first level negative example of the aerial-view image, the first level negative example of the aerial-view image including scenery of a different type from scenery in the ground-view image; and
the second phase training is performed using the ground-view image and a second level negative example of the aerial-view image, the second level negative example of the aerial-view image including scenery of a same type as scenery in the ground-view image.

Supplementary Note 8

The control method according to Supplementary Note 7, further comprising:
acquiring a positive example of the aerial-view image and plural negative examples of aerial-view images;
determining a type of scenery of each of the respective aerial-view images acquired;
using the negative example of the aerial-view image whose scenery is determined to be a different type from the scenery of the positive example of the aerial-view image, as the first level negative example of the aerial-view image; and
using the negative example of the aerial-view image whose scenery is determined to be a same type as the scenery of the positive example of the aerial-view image, as the second level negative example of the aerial-view image.

Supplementary Note 9

The control method according to Supplementary Note 7 or 8, further comprising:
acquiring a third negative example of the aerial-view image, whose degree of similarity to the ground-view image is higher than the degree of similarity of the second negative example of the aerial-view image to the ground-view image; and
performing a third phase training of the discriminator using the ground-view image and the third negative example of the aerial-view image.

Supplementary Note 10

The control method according to Supplementary Note 9, further comprising:
extracting features of the ground-view image and the second level negative example of the aerial-view image;
creating transformation parameters based on the extracted features of the ground-view image and the 2nd level negative example of the aerial-view image; and
acquiring the 3rd level negative example by transforming the 2nd level negative example of the aerial-view image to the 3rd level negative example of the aerial-view image based on the transformation parameters.

Supplementary Note 11

The control method according to Supplementary Note 10,
wherein the transformation includes a crop operation, an affine transformation, color modification, or image inpainting,
the transformation parameters specify a part of the 2nd level negative example of the aerial-view image to be cropped, in the case where the transformation includes a crop operation,
the transformation parameters include a transformation matrix with which an affine transformation on the 2nd level negative example of the aerial-view image is performed, in the case where the transformation includes an affine transformation,
the transformation parameters include sets of location of pixel of the 2nd level negative example of the aerial-view image and modification in color features to be applied to the corresponding pixel, in the case where the transformation includes a color modification, and
the transformation parameters include sets of location of pixel of the 2nd level negative example of the aerial-view image and a new pixel value to be set to the corresponding pixel, in the case where the transformation includes an image inpainting.

Supplementary Note 12

The control method according to any one of Supplementary Notes 7 to 11,
wherein the discriminator includes a first neural network, a second neural network, and a third neural network,
the first neural network acquires the ground-view image, and outputs feature maps of the ground-view image,
the second neural network acquires the aerial-view image, and outputs feature maps of the aerial-view image, and
the third neural network acquires the feature maps of the ground-view image and the feature maps of the aerial-view image, and outputs a data indicating whether the ground-view image matches the aerial-view image.

Supplementary Note 13

A non-transitory computer-readable storage medium storing a program that causes a computer to execute:
performing a first phase training of a discriminator, the discriminator acquiring a ground-view image and an aerial-view image and determining whether the acquired ground-view image matches the acquired aerial-view image; and
performing a second phase training of the discriminator,
wherein the first phase training is performed using a ground-view image, a positive example of the aerial-view image, and a first level negative example of the aerial-view image, the first level negative example of the aerial-view image including scenery of a different type from scenery in the ground-view image; and
the second phase training is performed using the ground-view image, a positive example of the aerial-view image, and a second level negative example of the aerial-view image, the second level negative example of the aerial-view image including scenery of a same type as scenery in the ground-view image.

Supplementary Note 14

The non-transitory computer-readable storage medium according to Supplementary Note 13, the program further causes the computer to execute:

acquiring a positive example of the aerial-view image and plural negative examples of the aerial-view images;

determining a type of scenery of each of the respective aerial-view images acquired;

using the negative example of the aerial-view image whose scenery is determined to be a different type from the scenery of the positive example of the aerial-view image, as the first level negative example of the aerial-view image; and using the negative example of the aerial-view image whose scenery is determined to be a same type as the scenery of the positive example of the aerial-view image, as the second level negative example of the aerial-view image.

Supplementary Note 15

The non-transitory computer-readable storage medium according to Supplementary Note 13 or 14, the program further causes the computer to execute:

acquiring a third negative example of the aerial-view image, whose degree of similarity to the ground-view image is higher than the degree of similarity of the second negative example of the aerial-view image to the ground-view image; and performing a third phase training of the discriminator using the ground-view image and the third negative example of the aerial-view image.

Supplementary Note 16

The non-transitory computer-readable storage medium according to Supplementary Note 15, the program further causes the computer to execute:

extracting features of the ground-view image and the second level negative example of the aerial-view image;

creating transformation parameters based on the extracted features of the ground-view image and the 2nd level negative example of the aerial-view image; and acquiring the 3rd level negative example by transforming the 2nd level negative example of the aerial-view image to the 3rd level negative example of the aerial-view image based on the transformation parameters.

Supplementary Note 17

The non-transitory computer-readable storage medium according to Supplementary Note 16, wherein the transformation includes a crop operation, an affine transformation, color modification, or image inpainting, the transformation parameters specify a part of the 2nd level negative example of the aerial-view image to be cropped, in the case where the transformation includes a crop operation, the transformation parameters include a transformation matrix with which an affine transformation on the 2nd level negative example of the aerial-view image is performed, in the case where the transformation includes an affine transformation, the transformation parameters include sets of location of pixel and modification in color features to be applied to the corresponding pixel, and the transformation parameters include sets of location of pixel and a new pixel value to be set to the corresponding pixel.

Supplementary Note 18

The non-transitory computer-readable storage medium according to any one of Supplementary Notes 13 to 17, wherein the discriminator includes a first neural network, a second neural network, and a third neural network, the first neural network acquires the ground-view image, and outputs feature maps of the ground-view image, the second neural network acquires the aerial-view image, and outputs feature maps of the aerial-view image, and the third neural network acquires the feature maps of the ground-view image and the feature maps of the aerial-view image, and outputs a data indicating whether the ground-view image matches the aerial-view image.

REFERENCE SIGNS LIST 10 discriminator
12 extraction network
14 extraction network
16 determination network
20 geo-localization system
30 location database
1000 computer
1020 bus
1040 processor
1060 memory
1080 storage device
1100 input/output interface
1120 network interface
2000 training apparatus
2020 acquisition unit
2040 1st phase training unit
2060 2nd phase training unit
2080 3rd phase training unit
2082 example generation unit
2084 extraction unit
2085 extraction unit
2086 parameter generation unit
2087 transformation unit

What is claimed is:

1. A training apparatus comprising:
at least one processor; and
memory storing instructions,
wherein the at least one processor is configured to execute the instructions to:
perform a first phase training of a discriminator, the discriminator acquiring a ground-view image and an aerial-view image and determining whether the acquired ground-view image matches the acquired aerial-view image; and
perform a second phase training of the discriminator,
the first phase training is performed using the ground-view image, a positive example of the aerial-view image, and a first level negative example of the aerial-view image, the first level negative example of the aerial-view image including scenery of a different type from scenery in the ground-view image; and
the second phase training is performed using the ground-view image, a positive example of the aerial-view image, and a second level negative example of the aerial-view image, the second level negative example of the aerial-view image including scenery of a same type as scenery in the ground-view image, wherein the at least one processor is further configured to execute the instructions to:
acquire a third negative example of the aerial-view image, whose degree of similarity to the ground-view image is higher than the degree of similarity of the second negative example of the aerial-view image to the ground-view image;
perform a third phase training of the discriminator using the ground-view image and the third negative example of the aerial-view image;
acquire a third negative example of the aerial-view image, whose degree of similarity to the ground-view image is higher than the degree of similarity of the second negative example of the aerial-view image to the ground-view image; and
perform a third phase training of the discriminator using the ground-view image and the third negative example of the aerial-view image.

2. A training apparatus according to claim 1,
wherein the at least one processor is further configured to:
acquire a positive example of the aerial-view image and plural negative examples of the aerial-view images;
determine a type of scenery of each of the respective aerial-view images acquired;
use the negative example of the aerial-view image whose scenery is determined to be a different type from the scenery of the positive example of the aerial-view image, as the first level negative example of the aerial-view image; and
use the negative example of the aerial-view image whose scenery is determined to be a same type as the scenery of the positive example of the aerial-view image, as the second level negative example of the aerial-view image.

3. The training apparatus according to claim 1,
wherein the transformation includes a crop operation, an affine transformation, color modification, or image inpainting,
the transformation parameters specify a part of the second level negative example of the aerial-view image to be cropped, in the case where the transformation includes a crop operation,
the transformation parameters include a transformation matrix with which an affine transformation on the second level negative example of the aerial-view image is performed, in the case where the transformation includes an affine transformation,
the transformation parameters include sets of location of pixel of the second level negative example of the aerial-view image and modification in color features to be applied to the corresponding pixel, in the case where the transformation includes a color modification, and
the transformation parameters include sets of location of pixel of the second level negative example of the aerial-view image and a new pixel value to be set to the corresponding pixel, in the case where the transformation includes an image inpainting.

4. The training apparatus according to claim 1,
wherein the discriminator includes a first neural network, a second neural network, and a third neural network,
the first neural network acquires the ground-view image, and outputs feature maps of the ground-view image,
the second neural network acquires the aerial-view image, and outputs feature maps of the aerial-view image, and
the third neural network acquires the feature maps of the ground-view image and the feature maps of the aerial-view image, and outputs a data indicating whether the ground-view image matches the aerial-view image.

5. A control method performed by a computer, comprising:
performing a first phase training of a discriminator, the discriminator acquiring a ground-view image and an aerial-view image and determining whether the acquired ground-view image matches the acquired aerial-view image; and
performing a second phase training of the discriminator,
wherein the first phase training is performed using the ground-view image, a positive example of the aerial-view image, and a first level negative example of the aerial-view image, the first level negative example of the aerial-view image including scenery of a different type from scenery in the ground-view image; and
the second phase training is performed using the ground-view image and a second level negative example of the aerial-view image, the second level negative example of the aerial-view image including scenery of a same type as scenery in the ground-view image,
the method further comprising:
acquiring a third negative example of the aerial-view image, whose degree of similarity to the ground-view image is higher than the degree of similarity of the second negative example of the aerial-view image to the ground-view image;
performing a third phase training of the discriminator using the ground-view image and the third negative example of the aerial-view image;
extracting features of the ground-view image and the second level negative example of the aerial-view image;
creating transformation parameters based on the extracted features of the ground-view image and the second level negative example of the aerial-view image; and
acquiring the third level negative example by transforming the second level negative example of the aerial-view image to the third level negative example of the aerial-view image based on the transformation parameters.

6. The control method according to claim 5, further comprising:
acquiring a positive example of the aerial-view image and plural negative examples of the aerial-view image;
determining a type of scenery of each of the respective aerial-view images acquired;
using the negative example of the aerial-view image whose scenery is determined to be a different type from the scenery of the positive example of the aerial-view image, as the first level negative example of the aerial-view image; and
using the negative example of the aerial-view image whose scenery is determined to be a same type as the scenery of the positive example of the aerial-view image, as the second level negative example of the aerial-view image.

7. The control method according to claim 5,
wherein the transformation includes a crop operation, an affine transformation, color modification, or image inpainting,
the transformation parameters specify a part of the second level negative example of the aerial-view image to be cropped, in the case where the transformation includes a crop operation,
the transformation parameters include a transformation matrix with which an affine transformation on the second level negative example of the aerial-view image is performed, in the case where the transformation includes an affine transformation, the transformation parameters include sets of location of pixel of the second level negative example of the aerial-view image and modification in color features to be applied to the corresponding pixel, in the case where the transformation includes a color modification, and the transformation parameters include sets of location of pixel of the second level negative example of the aerial-view image and a new pixel value to be set to the corresponding pixel, in the case where the transformation includes an image inpainting.

8. The control method according to claim 5, wherein the discriminator includes a first neural network, a second neural network, and a third neural network, the first neural network acquires the ground-view image, and outputs feature maps of the ground-view image, the second neural network acquires the aerial-view image, and outputs feature maps of the aerial-view image, and the third neural network acquires the feature maps of the ground-view image and the feature maps of the aerial-view image, and outputs a data indicating whether the ground-view image matches the aerial-view image.

9. A non-transitory computer-readable storage medium storing a program that causes a computer to execute:

performing a first phase training of a discriminator, the discriminator acquiring a ground-view image and an aerial-view image and determining whether the acquired ground-view image matches the acquired aerial-view image; and performing a second phase training of the discriminator, wherein the first phase training is performed using the ground-view image, a positive example of the aerial-view image, and a first level negative example of the aerial-view image, the first level negative example of the aerial-view image including scenery of a different type from scenery in the ground-view image; and the second phase training is performed using the ground-view image, a positive example of the aerial-view image, and a second level negative example of the aerial-view image, the second level negative example of the aerial-view image including scenery of a same type as scenery in the ground-view image, the program further causes the computer to execute acquiring a third negative example of the aerial-view image, whose degree of similarity to the ground-view image is higher than the degree of similarity of the second negative example of the aerial-view image to the ground-view image;

performing a third phase training of the discriminator using the ground-view image and the third negative example of the aerial-view image;

extracting features of the ground-view image and the second level negative example of the aerial-view image;

creating transformation parameters based on the extracted features of the ground-view image and the second level negative example of the aerial-view image; and acquiring the third level negative example by transforming the second level negative example of the aerial-view image to the third level negative example of the aerial-view image based on the transformation parameters.

10. The non-transitory computer-readable storage medium according to claim 9, the program further causes the computer to execute:

acquiring a positive example of the aerial-view image and plural negative examples of the aerial-view images;

determining a type of scenery of each of the respective aerial-view images acquired;

using the negative example of the aerial-view image whose scenery is determined to be a different type from the scenery of the positive example of the aerial-view image, as the first level negative example of the aerial-view image; and using the negative example of the aerial-view image whose scenery is determined to be a same type as the scenery of the positive example of the aerial-view image, as the second level negative example of the aerial-view image.

11. The non-transitory computer-readable storage medium according to claim 9, wherein the transformation includes a crop operation, an affine transformation, color modification, or image inpainting, the transformation parameters specify a part of the second level negative example of the aerial-view image to be cropped, in the case where the transformation includes a crop operation, the transformation parameters include a transformation matrix with which an affine transformation on the second level negative example of the aerial-view image is performed, in the case where the transformation includes an affine transformation, the transformation parameters include sets of location of pixel and modification in color features to be applied to the corresponding pixel, and the transformation parameters include sets of location of pixel and a new pixel value to be set to the corresponding pixel.

12. The non-transitory computer-readable storage medium according to claim 9, wherein the discriminator includes a first neural network, a second neural network, and a third neural network, the first neural network acquires the ground-view image, and outputs feature maps of the ground-view image, the second neural network acquires the aerial-view image, and outputs feature maps of the aerial-view image, and the third neural network acquires the feature maps of the ground-view image and the feature maps of the aerial-view image, and outputs a data indicating whether the ground-view image matches the aerial-view image.

* * * * *